United States Patent
Obenzinger

(10) Patent No.: US 10,452,724 B2
(45) Date of Patent: Oct. 22, 2019

(54) ATTRIBUTION MODEL FOR CONTENT ITEM CONVERSIONS

(71) Applicant: Google Inc., Mountain View, CA (US)

(72) Inventor: Eric Obenzinger, Mountain View, CA (US)

(73) Assignee: Google LLC, Mountain View, CA (US)

(*) Notice: Subject to any disclaimer, the term of this patent is extended or adjusted under 35 U.S.C. 154(b) by 576 days.

(21) Appl. No.: 15/157,858

(22) Filed: May 18, 2016

(65) Prior Publication Data
US 2017/0337276 A1   Nov. 23, 2017

(51) Int. Cl.
*G06F 16/00* (2019.01)
*G06F 16/951* (2019.01)
(Continued)

(52) U.S. Cl.
CPC ........ *G06F 16/951* (2019.01); *G06F 16/1734* (2019.01); *G06F 16/1805* (2019.01);
(Continued)

(58) Field of Classification Search
CPC .............. G06F 17/30896; G06Q 30/02; G06Q 30/0201; G06Q 30/0246; G06Q 30/0203; G06Q 30/0207; G06Q 30/0245; G06Q 30/0258; G06Q 40/08; G06Q 30/0242; G06Q 30/0263; G06Q 30/0273; G06Q 30/0601

See application file for complete search history.

(56) References Cited

U.S. PATENT DOCUMENTS

2005/0177401 A1*  8/2005  Koeppel ................ G06Q 30/02
                                                                 705/4
2008/0114875 A1*  5/2008  Anastas ............ G06F 17/30896
                                                                 709/224
(Continued)

FOREIGN PATENT DOCUMENTS

WO   WO-2013/116105 A1   8/2013

OTHER PUBLICATIONS

Abbreviated Examination Report under Section 18(3) re application No. GB1622428.9 dated Jun. 16, 2017.
(Continued)

*Primary Examiner* — Yicun Wu
(74) *Attorney, Agent, or Firm* — Foley & Lardner LLP

(57) ABSTRACT

Systems and methods for analyzing the impact of search content item impressions are provided. One method includes identifying interaction data, via conversion pixels embedded within a resource of a content provider. The conversion pixel is associated with a first content item of a content campaign. A conversion metric is generated using the interaction data, indicating an amount of conversions occurring after users viewed the first content item. An overlap rate is determined for the first content item, which is used to generate an adjusted conversion metric. The overlap rate indicates an estimated amount of users who interact with the first content item without interacting with a second content item, wherein the second content item is part of a content campaign and is presented in a resource other than the search result interface. The adjusted conversion metric is used to attribute conversions to the first and second content items.

20 Claims, 4 Drawing Sheets

(51) Int. Cl.
*G06F 16/17* (2019.01)
*G06F 16/18* (2019.01)
*G06Q 30/02* (2012.01)
*G06Q 30/08* (2012.01)
*G06F 16/245* (2019.01)

(52) U.S. Cl.
CPC ....... *G06F 16/245* (2019.01); *G06Q 30/0242* (2013.01); *G06Q 30/08* (2013.01)

(56) References Cited

U.S. PATENT DOCUMENTS

| | | |
|---|---|---|
| 2015/0278868 A1* | 10/2015 | O'Connor .......... G06Q 30/0263 705/14.41 |
| 2016/0027035 A1 | 1/2016 | Clemente Filho et al. |
| 2016/0050129 A1 | 2/2016 | Hoyne |
| 2017/0228768 A1* | 8/2017 | Saxena .............. G06Q 30/0246 |

OTHER PUBLICATIONS

International Search Report and Written Opinion on PCT/US2016/069609 dated Apr. 21, 2017.
International Preliminary Report on Patentability, PCT/US2017/028973, dated Nov. 8, 2018, pp. 1-7.
"Harry Hochheiser et al: Using interactive visualization of WWW log data to characterize access patterns and inform site design", Journal of the American Society for Information Science and Technology, Feb. 15, 2001 (Feb. 15, 2001), p. 331, XP055379940, Retrieved from the Internet: URL: ttps://www.cs.umd.edu/~ben/papers/Hochheiser2001Using.pdf.

* cited by examiner

ATTRIBUTION MODEL FOR CONTENT ITEM CONVERSIONS

BACKGROUND

In a networked environment, such as the Internet, first-party content providers can provide information to user devices for presentation on resources, such as webpages, mobile applications, documents, other applications, and/or other resources. Additional third-party content can also be provided by third-party content providers for presentation on the user devices together with the information from the first-party content providers. A publisher may provide first-party content and third-party content on his or her resource. In one implementation, a first-party content provider can provide a search result interface in response to a search query from the user device, and third-party content can be provided for display on the search result interface. One challenge is determining the effectiveness of different content from a third-party content provider on different platforms (e.g., content provided for search result interfaces and for other web sites).

SUMMARY

One illustrative implementation of the disclosure relates to a method. The method includes generating, by one or more processors, a conversion pixel for a resource of a content provider. The method further includes providing, by the one or more processors, a first content item for display on a search result interface. The method further includes associating, by the one or more processors, the conversion pixel to an impression of the first content item on the search result interface. The method further includes receiving, by the one or more processors, interaction data indicating user interactions with the resource, the interaction data transmitted in response to the conversion pixel causing the detection of a conversion event. The method further includes generating, by the one or more processors, log files comprising the interaction data. The method further includes parsing, by the one or more processors, the log files to identify interaction data related to the first content item. The method further includes generating, by the one or more processors using the interaction data, a conversion metric indicating an amount of view-through conversions occurring after users viewed an impression of the first content item in the search result interface. The method further includes determining, by the one or more processors, an overlap rate for the first content item. The overlap rate is one of: (1) an estimated amount of users who interact with the first content item in the search result interface without interacting with a second content item prior to conversion, wherein the second content item is part of a content campaign that includes the first content item, and the second content item is presented in a resource other than the search result interface; and (2) an estimated amount of users who interact with both the first content item and the second content item prior to conversion. The method further includes reducing, by the one or more processors, the conversion metric using the overlap rate to generate an adjusted conversion metric. The method further includes transmitting, by the one or more processors, the adjusted conversion metric to an attribution system that attributes a plurality of conversions associated with the content campaign to the first content item and second content item.

Another implementation relates to a system including at least one computing device operably coupled to at least one memory. The at least one computing device is configured to generate a conversion pixel for a resource of a content provider. The at least one computing device is further configured to provide a first content item for display on a search result interface. The at least one computing device is further configured to associate the conversion pixel to an impression of the first content item on the search result interface. The at least one computing device is further configured to receive interaction data indicating user interactions with the resource, the interaction data transmitted in response to the conversion pixel causing the detection of a conversion event. The at least one computing device is further configured to generate log files comprising the interaction data. The at least one computing device is further configured to parsing the log files to identify interaction data related to the first content item. The at least one computing device is further configured to generate a conversion metric indicating an amount of view-through conversions occurring after users viewed an impression of the first content item in the search result interface. The at least one computing device is further configured to determine an overlap rate for the first content item. The overlap rate is one of: (1) an estimated amount of users who interact with the first content item in the search result interface without interacting with a second content item prior to conversion, wherein the second content item is part of a content campaign, and the second content item is presented in a resource other than the search result interface; and (2) an estimated amount of users who interact with both the first content item and the second content item prior to conversion. The at least one computing device is further configured to reduce the conversion metric using the overlap rate to generate an adjusted conversion metric. The at least one computing device is further configured to transmit the adjusted conversion metric to an attribution system that attributes a plurality of conversions associated with the content campaign to the first content item and second content item.

Yet another implementation relates to one or more computer-readable storage media having instructions stored thereon that, when executed by one or more processors, cause the one or more processors to execute operations. The operations include generating a conversion pixel for a resource of a content provider. The operations further include providing a first content item for display on a search result interface. The operations further include associating the conversion pixel to an impression of the first content item on the search result interface. The operations further include receiving interaction data indicating user interactions with the resource, the interaction data transmitted in response to the conversion pixel causing the detection of a conversion event. The operations further include generating log files comprising the interaction data. The operations further include parsing the log files to identify interaction data related to the first content item. The operations further include generating, using the interaction data, a conversion metric indicating an amount of view-through conversions occurring after users viewed an impression of the first content item in the search result interface. The operations further include determining an overlap rate for the first content item. The overlap rate is one of: (1) an estimated amount of users who interact with the first content item in the search result interface without interacting with a second content item prior to conversion, wherein the second content item is part of a content campaign that includes the first content item, and the second content item is presented in a resource other than the search result interface; and (2) an estimated amount of users who interact with both the first content item and the second content item prior to conversion. The operations further include reducing the conversion metric using the overlap rate to generate an adjusted conversion metric. The operations further include transmitting the adjusted conversion metric to an attribution system that attributes a plurality of conversions associated with the content campaign to the first content item and second content item.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
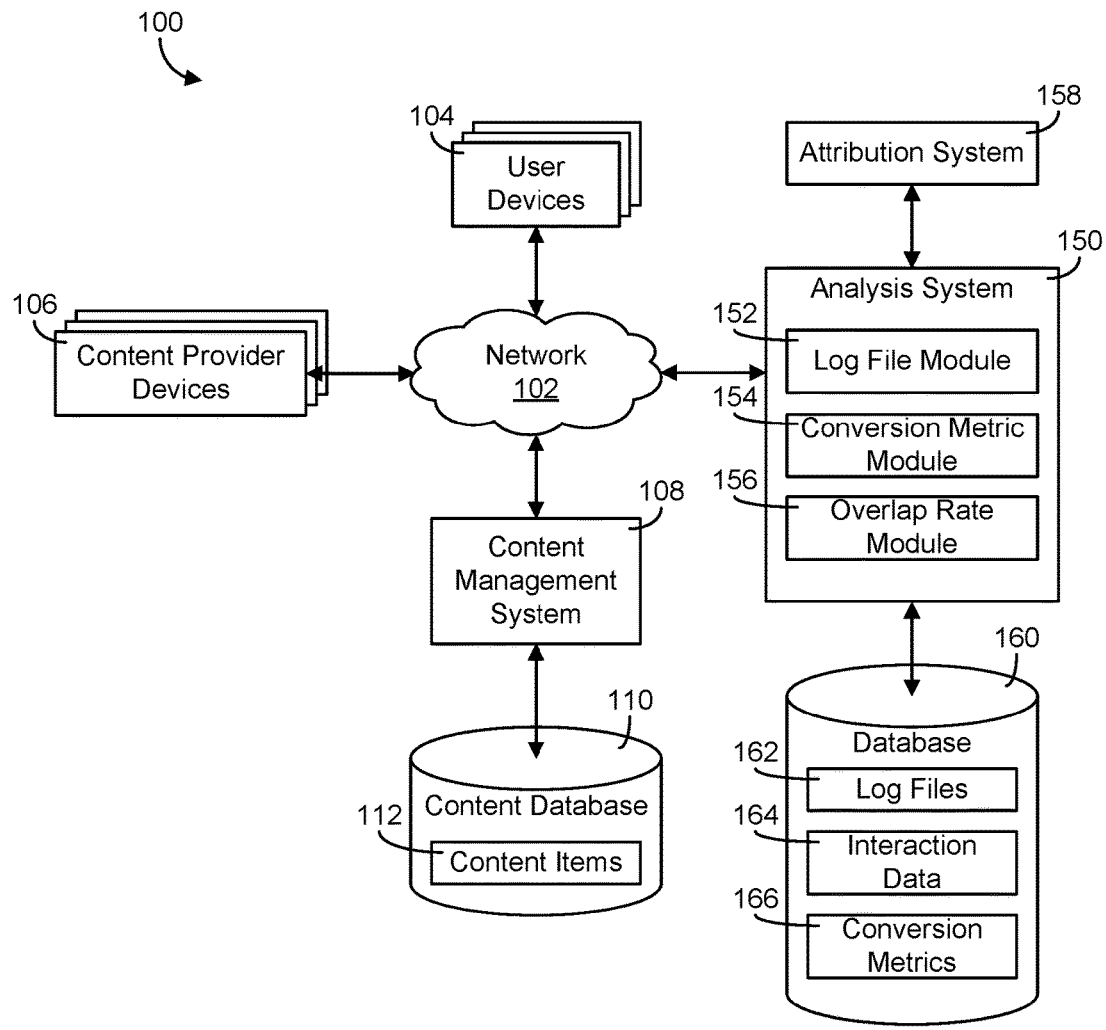
FIG. 1 is a block diagram of an attribution system and associated environment according to an illustrative implementation.

Following below are more detailed descriptions of various concepts related to, and implementations of, methods, apparatuses, and systems for providing information using a computer network. The various concepts introduced above and discussed in greater detail below may be implemented in any of numerous ways as the described concepts are not limited to any particular manner of implementation. Examples of specific implementations and applications are provided primarily for illustrative purposes.

Referring generally to the figures, various illustrative systems and methods are provided for analyzing the impact of search content item impressions for a client. An attribution model can be used to measure the number of clicks, conversions, and other actions related to the presentation of one or more content items on one or more resources (e.g., webpages). Third-party attribution models generally rely on click and view conversions for a content item, but cannot collect view conversions for content items displayed on search result interfaces (which generally do not allow third-party tracking on search content item impressions, for privacy and latency reasons). The lack of data for view-through conversions for content items on search result interfaces can skew attribution models, and can generally make display impressions look more efficient than search impressions (i.e., making content items displayed in non-search result interfaces look more efficient than content items displayed on search result interfaces).

The present disclosure includes systems and methods for accounting for conversions related to content items displayed on a search result interface. One method includes implementing a pixel, such as a conversion pixel, on a resource of a content provider (the resource being a resource where a user may have a conversion event, separate from a resource such as a search result interface where a search content item may be displayed). A link is formed between a conversion event on the resource (i.e., a user making a desired action on the resource of the content provider, such as completing a purchase on a webpage) and a search content item impression (e.g., the display of a search content item related to the conversion event on a search result interface). The publisher (e.g., the search engine responsible for providing the search result interface) may link the conversion event and impression, in some implementations. When a conversion event occurs, interaction data relating to the conversion event is received, and the interaction data may be used to generate a conversion metric for the search content items. The conversion metrics may include, for example, a number of clicks or impressions of the search content items, a cost associated with displaying the search content items, etc.

An overlap rate may be set between search content items (e.g., content items for display on a search platform, such as a platform that disallows third-party view-through conversion tracking) and display content items (e.g., content items for display on a webpage). In some implementations, the overlap rate may generally identify one of: (1) an amount (e.g., a percentage) of users who perform a conversion after interacting with a search content item and not interacting with a display content item prior to conversion; or (2) an amount of users who perform a conversion after interacting with both a search content item and a display content item. This overlap rate identifies the number of search content item conversions as compared to total conversions or display content item conversions. In some implementations, the overlap rate may be chosen by a content provider (e.g., the client providing the content item for display) based on search content item metrics (described below), or may be determined by a content management system (e.g., a system configured to select and present content items to users, such as via an auction process). The overlap rate can be an observed rate, based on previous data. In some implementations, the overlap rate is 25% or close to 25%. In other implementations, the overlap rate may be 30% or 20%. In other implementations, the overlap rate may be between a range of 20% to 35%, chosen by the content provider or content management system. The overlap rate is used to reduce the conversion metric in order to generate an adjusted conversion metric that represents a unique number of conversions related to the display of the search content items. In other words, by applying the overlap rate to a conversion metric designed to measure the effect of search content items, the conversion metric is reduced to account for cases in which a display content item, instead of or in addition to a search content item, actually led to a particular conversion.

In some implementations, the method may account for the position of search content items on the search result interface. For example, some search content items may be displayed at the top of the page, while others may be displayed lower on the page. A tiered system may be implemented wherein, for search content items displayed at the bottom of the page, a smaller overlap rate may be used (e.g., 20% or 15% instead of 25%). The amount by which the overlap rate is adjusted may be chosen by a content provider or the content management system, based on various factors (e.g., historical performance of previous content items displayed in certain positions on the search result interface).

The method as described above outputs an adjusted view-through conversion count, in some implementations. The adjustments made as described above reflect the overlapping of conversions between search content items and display content items, along with the position of the search content items, to determine a view-through conversion count for a search content item that previously was unmeasurable. This adjusted view-through conversion count can be added with the last-click conversions (e.g., conversions where a user interacted with a content item) to provide the client with the campaign with an incremental contribution percentage (or total count) of view-based conversions to the campaign. This percentage or count can be used to help manage the client's campaign, such as adjusting a client's cost per action (CPA).

Referring now to FIG. 1, and in brief overview, a block diagram of an analysis system 150 and associated environment 100 is shown according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access webpages (e.g., using an Internet browser), media files, and/or any other types of content. A content management system 108 may be configured to select content for display to users within resources (e.g., webpages, applications, etc.) and to provide content items 112 from a content database 110 to user devices 104 over network 102 for display within the resources. The content items from which content management system 108 selects may be provided by one or more content providers via network 102 using one or more content provider devices 106. In some implementations, bids for content to be selected by content management system 108 may be provided to content management system 108 from content providers participating in an auction. In such implementations, content management system 108 may determine content to be published in one or more content interfaces of resources (e.g., webpages, applications, etc.) shown on user devices 104 based at least in part on the bids.

An analysis system 150 may be configured to receive interaction data from a plurality of resources of a content provider. The interaction data indicates user interactions with the content provider resource. Analysis system 150 may use the interaction data to generate conversion metrics for search content items that are related to the user interactions. The conversion metrics may be, for example, a number of clicks or impressions of the search content items, a cost associated with displaying the search content items. The conversion metrics may be adjusted based on an overlap rate in order to generate adjusted conversion metrics that can be used to attribute conversions to the search content items. In other words, the effectiveness of the search content items may be determined using the conversion metrics and the overlap rate. The overlap rate generally represents a user interaction with both search content items displayed on the search result interface and display content items displayed on other resources.

Referring in greater detail to FIG. 1, user devices 104 and/or content provider devices 106 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set. In some implementations, content may be provided via a web-based application and/or an application resident on a user device 104. In some implementations, user devices 104 and/or content provider devices 106 may be designed to use various types of software and/or operating systems. In various illustrative implementations, user devices 104 and/or content provider devices 106 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.). As described in the present disclosure, user devices 104 may be accessible by either a visitor of a resource or by a publisher of a resource.

User devices 104 and/or content provider devices 106 may be configured to receive data from various sources using a network 102. In some implementations, network 102 may include a computing network (e.g., LAN, WAN, Internet, etc.) to which user devices 104 and/or content provider device 106 may be connected via any type of network connection (e.g., wired, such as Ethernet, phone line, power line, etc., or wireless, such as WiFi, WiMAX, 3G, 4G, satellite, etc.). In some implementations, network 102 may include a media distribution network, such as cable (e.g., coaxial metal cable), satellite, fiber optic, etc., configured to distribute media programming and/or data content.

Content management system 108 may be configured to conduct a content auction among third-party content providers to determine which third-party content is to be provided to a user device 104. For example, content management system 108 may conduct a real-time content auction in response to a user device 104 requesting first-party content from a content source (e.g., a webpage, search engine provider, etc.) or executing a first-party application. Content management system 108 may use any number of factors to determine the winner of the auction. For example, the winner of a content auction may be based in part on the third-party content provider's bid and/or a quality score for the third-party provider's content (e.g., a measure of how likely the user of the user device 104 is to click on the content). In other words, the highest bidder is not necessarily the winner of a content auction conducted by content management system 108, in some implementations.

Content management system 108 may be configured to allow third-party content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at user devices 104. In some implementations, the bid amount may be on a cost per impression or cost per thousand impressions (CPM) basis. In further implementations, a bid amount may correspond to a specified action being performed in response to the third-party content being presented at a user device 104. For example, a bid amount may be a monetary amount that the third-party content provider is willing to pay, should their content be clicked on at the client device, thereby redirecting the client device to the provider's resource. In other words, a bid amount may be a cost per click (CPC) bid amount. In another example, the bid amount may correspond to an action being performed on the third-party provider's resource, such as the user of the user device 104 making a purchase. Such bids are typically referred to as being on a cost per acquisition (CPA) or cost per conversion basis. Metrics may be generated for the campaign based on the performance of content items in the campaign compared to the bid amounts and other costs related to the display of the content items.

A campaign created via content management system 108 may also include selection parameters that control when a bid is placed on behalf of a third-party content provider in a content auction. If the third-party content is to be presented in conjunction with search results from a search engine, for example, the selection parameters may include one or more sets of search keywords. For instance, the third-party content provider may only participate in content auctions in which a search query for "golf resorts in California" is sent to a search engine. Other illustrative parameters that control when a bid is placed on behalf of a third-party content provider may include, but are not limited to, a topic identified using a device identifier's history data (e.g., based on resources visited by the device identifier), the topic of a resource or other first-party content with which the third-party content is to be presented, a geographic location of the client device that will be presenting the content, or a geographic location specified as part of a search query. In some cases, a selection parameter may designate a specific resource or resources with which the third-party content is to be presented. For example, an advertiser selling golf equipment may specify that they wish to place an advertisement on the sports page of a particular online newspaper.

In some implementations, using the various bid-related parameters and selection parameters, a content provider may create a content item campaign that includes a plurality of content items for display on a search result interface and a plurality of content items for display on other resources. An attribution model may be used to measure the number of interactions with content items in a content campaign. However, as described above, attributing conversions that occur based on a user interaction with a search content item may be difficult, as third-party tracking of the search content item on a search result interface may not be allowed.

As described above, an analysis system 150 is configured to determine conversion metrics that can be used to properly attribute conversions to a plurality of search content items and display content items in a content campaign. Analysis system 150 is shown to include a log file module 152 configured to receive interaction data for a plurality of content provider resources and generate one or log files including the interaction data. The interaction data for the content items is generated using a conversion pixel on the content provider resource.

Log file module 152 may receive the interaction data and generate log files 162 including the interaction data. Log files 162 may include interaction data for a plurality of conversion events on the content provider resource. For example, a conversion event may include a user completing a purchase on the resource, watching a video or viewing an image, clicking on a link, or any other action that may be desired by the content provider providing the resource. Log files 162 may store additional interaction data such as a date/time or timestamp, a platform (e.g., browser) used to view the resource, and the like. A conversion metric module 154 of analysis system 150 may then use the log files to generate a conversion metric for a particular search content item.

Conversion metric module 154 may be configured to link one or more conversion events on the content provider resource to one or more search content items. As described above, in some implementations, a conversion event on the content provider resource may be linked to one or more search content items that may be related to the conversion event. For example, if the user completed a purchase on the resource, it may be possible that one or more search content items that displayed the product that was purchased may have led to the purchase. When a conversion event occurs, a unique identifier may be included as part of data transmitted to analysis system 150. The unique identifier may identify a particular browser or other application that has executed a conversion event for a specific content provider. The browser (or other identified application) may be matched with browsers that had an impression of a related content item (i.e., browsers that viewed a content item and eventually had a conversion event related to the content item). If there is a match, a link between the conversion event and content item may be created. The linking may further include checking when and where a browser was exposed to the content item (e.g., to ensure that the user had a recent impression of the content item before the conversion event).

Conversion metric module 154 may parse the log files to identify interaction data for a particular search content item, using the links between the search content items and the plurality of conversion events. The search content item may be part of a content campaign including a plurality of search content items and display content items. Once the interaction data for the particular search content item is identified, a conversion metric is generated for the search content item. The conversion metric is representative of an amount of view-through conversions for the search content item occurring after users viewed an impression of the search content item in the search result interface, without selecting the search content item. In other words, the conversion metric identifies an amount of desired actions taken by a user on a resource, after viewing the content item on a search result interface.

Analysis system 150 is shown to include an overlap rate module 156 configured to determine an overlap rate between the search content items and display content items in a content campaign. In some implementations, the overlap rate may identify an estimated amount of users who interacted with a search content item in a search result interface without interacting with a display content item in the same content campaign prior to a conversion. In other implementations, the overlap rate may identify an estimated amount of users who interacted with both a search content item and display content item in a content campaign prior to a conversion event. In other words, the overlap rate may generally identify a relationship between interactions with search content items and display content items by a plurality of users. The overlap rate may define how often an interaction with a search content item but not a display content item results in a conversion for the content campaign, as compared to all conversions related to all content items in a content campaign.

In some implementations, the overlap rate may be calculated by a content provider or by a system in environment 100 (e.g., analysis system 150, content management system 108, etc.). As one example, the overlap rate may be chosen by a content provider. The content provider may view the performance of various content items in a content campaign (e.g., a total number of conversions, a cost per action or other metrics related to the presentation of the content items, etc.) and determine an overlap rate based on the historic data. In some implementations, the overlap rate may be chosen to be 25%, or another value near 25%. This value is representative of a number of users who had a conversion event after only interacting with a search content item (i.e., having a conversion event without having an interaction with a display content item). The overlap rate therefore identifies a percentage of total conversions that are not directly trackable by analysis system 150 (since third-party tracking on search result interfaces are typically not allowed).

Conversion metric module 154 may receive the overlap rate and apply the overlap rate to the conversion metric to generate an adjusted conversion metric. By applying the overlap rate to the conversion metric, analysis system 150 is able to estimate conversion information that is not trackable because of the lack of third-party tracking on search result interfaces. For example, the adjusted conversion metric may be used to estimate a number of view-through conversions for the search content item, which represents a number of views of the search content item by a user, as view-through conversions may not otherwise be trackable by analysis system 150. The adjusted conversion metric is a metric that factors in conversion events related to search content items that were otherwise unaccounted for in the original conversion metric. This adjusted conversion metric may then be provided to an attribution system 158 configured to attribute conversions to both search content items and display content items in a content campaign.

While attribution system 158 is shown as a separate system in environment 100, in various implementations attribution system 158 may be integrated with other systems. For example, attribution system 158 may be a system local to a content provider, and analysis system 150 may transmit the adjusted conversion metric to the content provider. The content provider may then attribute conversions to content items in the content campaign of the content provider locally. As another example, attribution system 158 may be a part of analysis system 150, and analysis system 150 may attribute conversions to content items in the content campaign and transmit the attributions to the content providers and content management system 108.

Environment 100 is shown to include a database 160 configured to store log files 162 generated by log file module 152. Conversion metric module 154 may retrieve log files 162 from database 160 as described above. In some implementations, database 160 may further be configured to store interaction data 164 or conversion metrics 166 generated by conversion metric module 154. In other implementations, such data may not be stored by analysis system 150. It should be understood that database 160 may store such data in any format and may be any type of data storage device.

Figure 2:
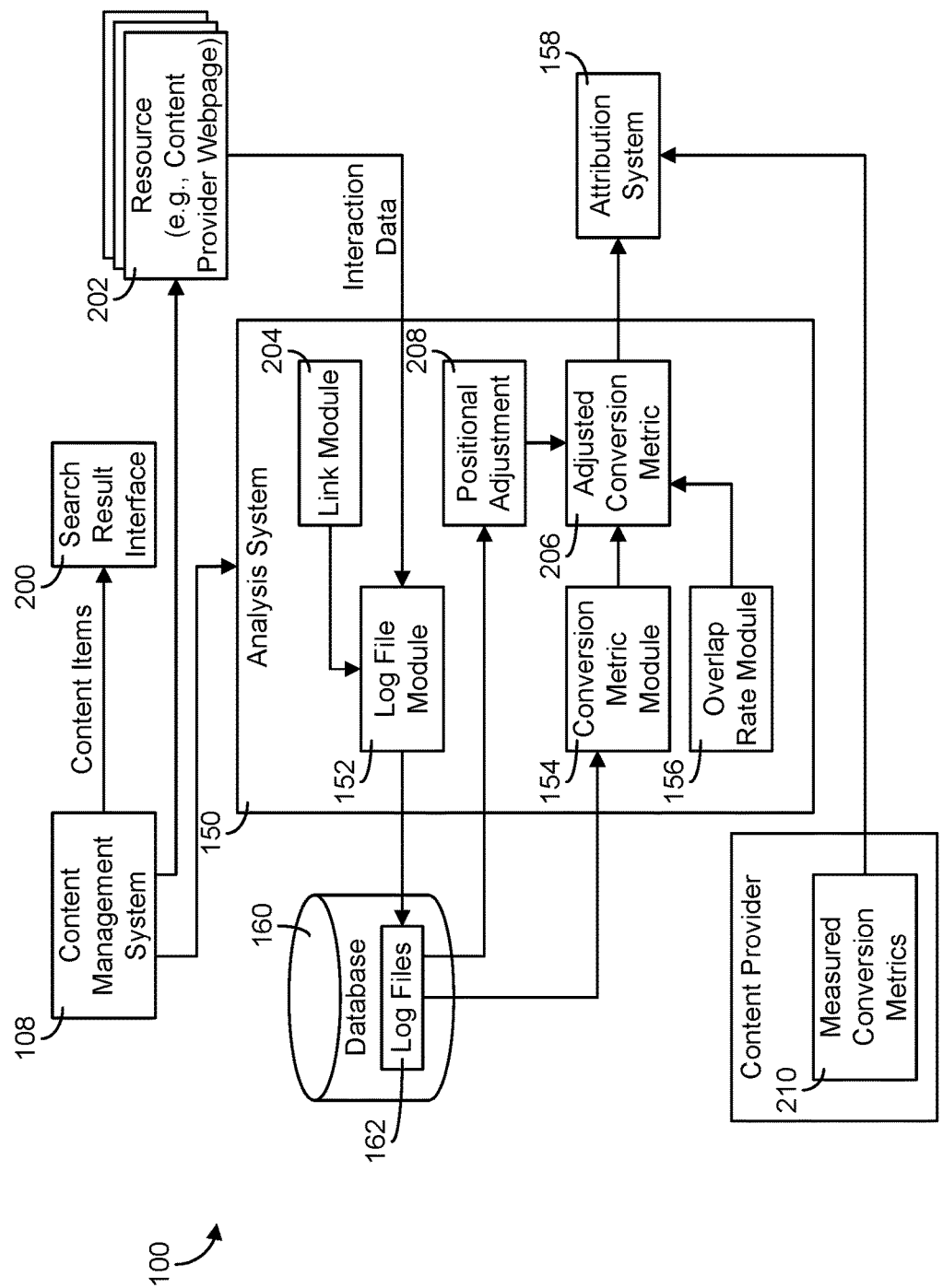
FIG. 2 is a detailed block diagram illustrating a process of generating a conversion metric based on interaction data for a search content item displayed on a search result interface according to an illustrative implementation.

Referring to FIG. 2, the activities of analysis system 150 and environment 100 are shown in greater detail. As described above, content management system 108 provides a plurality of content items for display on a plurality of search result interfaces 200. Content management system 108 may receive a request for content items for display on search result interface 200. The request may generally include a search query such that content management system 108 can provide content items related to the search query. Analysis system 150 may receive information from content management system 108 relating to the search content items provided for display on search result interface 200.

Analysis system 150 (or another system in environment 100 in other implementations) may generate a pixel for a resource of the content provider. In some implementations, the pixel is known as a tracking pixel (i.e., conversion pixel), configured to detect a user interaction with the resource. The pixel may generally include code embedded within the resource. The code may be any type of code such as HTML, Javascript, or any other code compatible with the resource. When a conversion event is detected by the code, the code may cause the resource (e.g., the browser) to transmit a data packet including interaction data to analysis system 150. For example, upon a user completing a purchase or other end event on the resource, the code may cause the data packet to be sent. The data packet may include, for example, an identifier identifying the specific action that caused the interaction data to be transmitted, an identifier for the content item displayed, a timestamp, and the like.

In some implementations, for content items to be displayed on resources other than search result interfaces, a third-party tag may be embedded within the content item. The third-party tag may be provided by, for example, the content provider providing the content item for display on the resource. The third-party tag tracks conversion events that occur relating to the display of the content item, and the eventual attribution of the conversion event for the content item is made by the third-party (e.g., by the content provider). However, as described above, for search result interfaces, third-party tags may not be allowed to be embedded within content item displayed on the resource. In various implementations of the present disclosure, a conversion pixel is provided instead of a tag, which may be linked with the content items to be displayed on search result interface 200 via a link module 204. Link module 204 may link the conversion pixel and content item such that when the conversion pixel detects a conversion event, analysis system may eventually associate the content item with the conversion event. In some implementations, the data transmitted by the conversion pixel may include a browser identifier and the resource (e.g., the webpage of the content provider), which may be used to match the conversion event to a content item displayed on the same browser recently. Link module 204 may access, for example, one or more logs including browser data that indicates when and where a particular content item was presented to a user on a browser, in order to create the link between a conversion event and a content item.

The action taken by the user on resource 202 may be viewing an impression (e.g., viewing particular content or media on the resource, scrolling to a portion of the resource, etc.), a hover or click event (e.g., the user hovering a mouse over a specific area, the user clicking a link), a conversion (e.g., the user clicking a link and then completing a follow-up event, such as a purchase), or otherwise. The conversion pixel detects the action taken by the user and reports user interaction data to analysis system 150. Analysis system 150 (and more particularly log file module 152) is configured to generate log files 162 including the interaction data. The interaction data may generally include the type of action taken by the user (e.g., impression, click, conversion), details of the action (e.g., a purchase amount, a length of impression, etc.), a timestamp for the user interaction, and the like. It should be understood at the interaction data may vary based on the type of resource 202 and type of information requested or needed by a system of environment 100.

Analysis system 150 (and more particularly conversion metric module 154) is configured to parse log files 162 to determine interaction data for one or more particular content items in a content campaign (e.g., a content campaign for an individual content provider). The interaction data may then be used along with data from a content provider (via a content provider device 106) to generate a conversion metric. The conversion metric may be a metric representative of an amount of conversions that occurred after user interaction with a content item linked with the conversions. For example, conversion metric module 154 may receive information from link module 204 relating to which content items may be linked to a particular conversion event. Conversion metric module 154 may use the received metrics and the interaction data from log files 162 to generate a conversion metric that represents a number of conversion events on a resource 202 that relate to a content campaign but do not relate to any specific measured interaction with a content item.

Overlap rate module 156, as described above, may calculate an overlap rate indicating an estimated amount of users who interacted with a content item displayed on the search result interface but not a content item displayed on another resource. In some implementations, the overlap rate is provided by the content provider of the content campaign. The overlap rate may be a rate observed or calculated by the content provider. In other implementations, the overlap rate may be based on a historical conversion rate for one or more content items in the content campaign. For example, an observed conversion rate for display content items (e.g., content items not displayed in a search result interface) may be used to determine the overlap rate. The overlap rate may be applied to the conversion metric to obtain an adjusted conversion metric 206 that is representative of a number of total conversions related to the display of search content items in the content campaign.

As shown in FIG. 2, a positional adjustment 208 may be applied to adjusted conversion metric 206. Positional adjustment 208 may adjust for the location of the search content items on the search result interfaces when generating the conversion metric representative of conversions related to the display of the search content items. For example, search content items displayed on the top of a search result interface are more likely to be viewed by a user than search content items displayed on the side of the resource, or farther down on the resource (e.g., such that a user has to scroll down the resource in order to view the search content item). The position of one or more search content items in the content campaign may be extracted from log files 162 as described above. This position may be used to create the adjusted conversion metric by adjusting the overlap rate. For example, the overlap rate used to calculate the adjusted conversion metric may be unchanged if the search content item is displayed at the top of the search result interface. As another example, the overlap rate may be increased (e.g., from 75% to 80% or 90%) if the search content item is lower on the search result interface. The adjustment of the overlap rate may be proportional (e.g., increasing the overlap rate the farther down the resource the search content item is located), and any type or number of thresholds may be used to determine how to increase or decrease the overlap rate.

Adjusted conversion metric 206 may be transmitted to an attribution system 158. As described above, attribution system 158 may be local to analysis system 150 or the content provider. Using adjusted conversion metric 206, attribution system 158 may attribute a plurality of conversions to a plurality of content items in a content campaign. For example, attribution system 158 may attribute a portion of conversions to search content items for which the attribution system otherwise does not have conversion metrics for, and another portion of conversions to display content items.

In some implementations, attribution system 158 may combine adjusted conversion metrics 206 with measured conversion metrics 210 to determine a combined conversion metric. For example, for a particular content item displayed on different resources, conversion metrics for content items some resources may be available (e.g., which may be measurable because the content item was displayed on a resource that allows tracking of conversions) while conversion metrics for other resources may not be available. The conversion metrics may include one or both of click-through or view-through conversion metrics. In such a situation, attribution system 158 may combine adjusted conversion metrics with measured conversion metrics 210 to estimate a total number of conversions and other conversion metrics.

In some implementations, the attribution of conversions by attribution system 158 may be used to adjust a content campaign of the content provider. For example, based on the attributions, a cost per action metric may be adjusted for a content item in the content campaign. The cost per action metric is generally representative of a cost for the content provider in order to attain a conversion. By adjusting the cost per action metric, the content provider may choose to pay more or less for providing the content item for display on a resource, thereby adjusting the parameters of the content campaign of the content provider. In other words, the content provider may adjust its strategy for providing various content items in a content campaign, based on a more accurate representation of the performance of search content items on search result interfaces.

Figure 3:
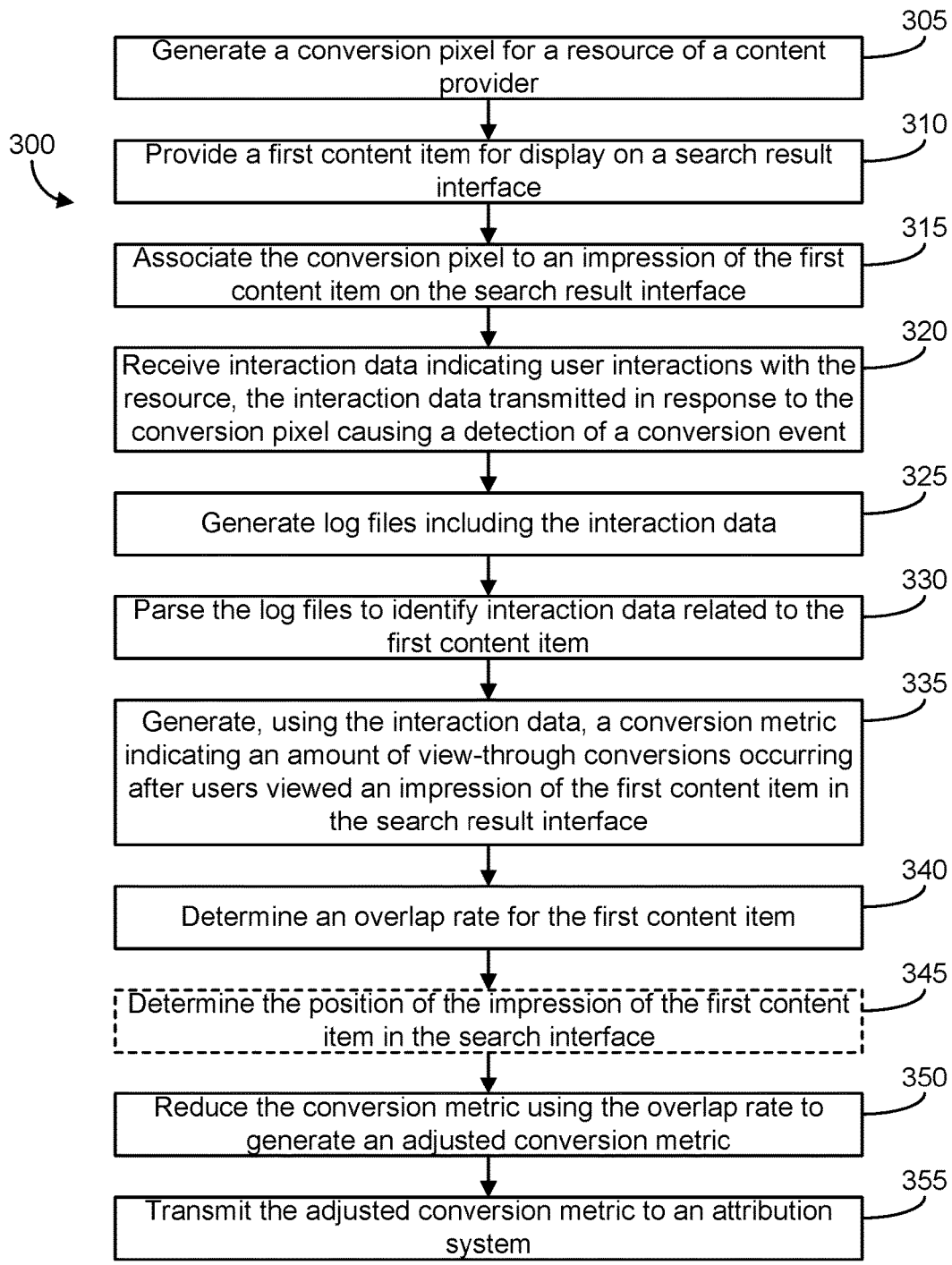
FIG. 3 is a flow diagram of a process for attributing a plurality of conversions associated with a content campaign to search content items and display content items of the content campaign according to an illustrative implementation.

Referring now to FIG. 3, a flow diagram of a process 300 for attributing a plurality of conversions associated with a content campaign to search content items and display content items of the content campaign is shown. Process 300 may be executed by, for example, analysis system 150 as described with reference to FIGS. 1-2.

Process 300 includes generating a conversion pixel for a resource of a content provider (305). The conversion pixel may be configured to detect a conversion event on the resource. The conversion event may be a purchase, a click on a link, or any other type of desired action taken by a user on the resource (e.g., webpage). Process 300 further includes providing a first content item for display on a search result interface (310). The content item may be, for example, a search content item provided for display with search results from a search query by a user. Process 300 further includes associating the conversion pixel to an impression of the first content item on the search result interface (315). For example, block 315 may include determining one or more content items that may be related to a particular conversion event on the content provider's resource, and associating the event to the content item. By associating the conversion event and content item, an impression of the content item may be given credit for causing the conversion event to occur, as described below. Process 300 further includes receiving interaction data indicating user interactions with the resource (320). The interaction data is transmitted in response to the conversion pixel causing the detection of a conversion event.

Process 300 further includes generating log files including the interaction data (325) and parsing the log files to identify the interaction data related to the first content item (330). The analysis system may generate log files for interaction data for a plurality of content items, and block 330 may include identifying interaction data specific to the first content item in the log files.

Process 300 further includes generating, using the interaction data, a conversion metric indicating an amount of view-through conversions occurring after users viewed an impression of the first content item in the search result interface without selecting the first content item (335). The conversion metric represents a number of desired actions taken by a user upon viewing the first content item, without the user selecting the first content item. Process 300 further includes determining an overlap rate for the first content item (340). In one implementation, the overlap rate is an estimated amount of users who interact with the first content item in the search result interface without interacting with a second content item prior to conversion, wherein the second content item is part of a content campaign that includes the first content item, and the second content item is presented in a resource other than the search result interface. In another implementation, the overlap rate is an estimated amount of users who interact with both the first content item and the second content item prior to conversion. The overlap rate generally identifies a relationship between interactions with search content items and display content items by a plurality of users. In some implementations, the overlap rate is provided by a content provider of the first content item and the second content item. In other implementations, the overlap rate is based on a historical conversion rate for the second content item.

Process 300 may further include determining the position of the impression of the first content item in the search interface (345). For example, the first content item is more likely to be viewed by a user if the first content item is located at or near the top of the search interface.

Process 300 further includes reducing the conversion metric using the overlap rate to generate an adjusted conversion metric (350). By using the overlap rate, the conversion metric is reduced to estimate metrics that were not measurable by the analysis system. In some implementations, the position of the first content item in the search interface may be used in generating the adjusted conversion metric. For example, the overlap rate may be increased if the position of the first content item in the search interface is lower (since it is less likely that the user viewed the first content item, the overlap rate is increased to decrease the impact of the adjusted conversion metric in adding to a total amount of conversions).

Process 300 further includes transmitting the adjusted conversion metric to an attribution system (355). The attribution system may attribute a plurality of conversions associated with the content campaign to the first content item and second content item. In some implementations, process 300 further includes, at the attribution system, determining a click-through conversion metric indicating an amount of click-through conversions in which the users performed a conversion after selecting the first content item. The adjusted conversion metric may be combined with the click-through conversion metric to generate a combined conversion metric for the first content item. Further, process 300 may include adjusting a cost per action metric for the first content item based on the combined conversion metric, wherein the cost per action metric represents an amount spent by a content provider per conversion for the first content item.

Figure 4:
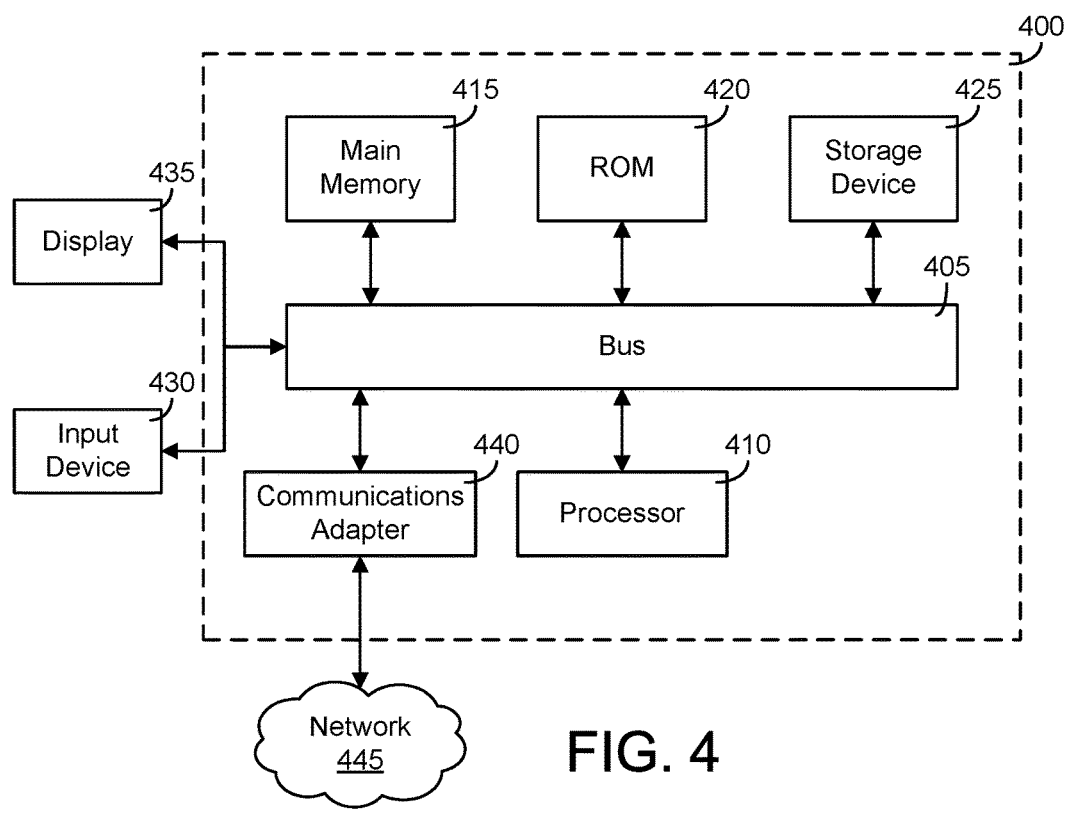
FIG. 4 is a block diagram of a computing system according to an illustrative implementation.

FIG. 4 illustrates a depiction of a computer system 400 that can be used, for example, to implement an illustrative user device 104, an illustrative content management system 108, an illustrative content provider device 106, an illustrative analysis system 150, and/or various other illustrative systems described in the present disclosure. Computing system 400 includes a bus 405 or other communication component for communicating information and a processor 410 coupled to bus 405 for processing information. Computing system 400 also includes main memory 415, such as a random access memory (RAM) or other dynamic storage device, coupled to bus 405 for storing information, and instructions to be executed by processor 410. Main memory 415 can also be used for storing position information, temporary variables, or other intermediate information during execution of instructions by processor 410. Computing system 400 may further include a read only memory (ROM) 420 or other static storage device coupled to bus 405 for storing static information and instructions for processor 410. A storage device 425, such as a solid state device, magnetic disk or optical disk, is coupled to bus 405 for persistently storing information and instructions.

Computing system 400 may be coupled via bus 405 to a display 435, such as a liquid crystal display, or active matrix display, for displaying information to a user. An input device 430, such as a keyboard including alphanumeric and other keys, may be coupled to bus 405 for communicating information, and command selections to processor 510. In another implementation, input device 430 has a touch screen display 435. Input device 430 can include a cursor control, such as a mouse, a trackball, or cursor direction keys, for communicating direction information and command selections to processor 410 and for controlling cursor movement on display 435.

In some implementations, computing system 400 may include a communications adapter 440, such as a networking adapter. Communications adapter 440 may be coupled to bus 405 and may be configured to enable communications with a computing or communications network 445 and/or other computing systems. In various illustrative implementations, any type of networking configuration may be achieved using communications adapter 440, such as wired (e.g., via Ethernet®), wireless (e.g., via WiFi®, Bluetooth®, etc.), pre-configured, ad-hoc, LAN, WAN, etc.

According to various implementations, the processes that effectuate illustrative implementations that are described herein can be achieved by computing system 400 in response to processor 410 executing an arrangement of instructions contained in main memory 415. Such instructions can be read into main memory 415 from another computer-readable medium, such as storage device 425. Execution of the arrangement of instructions contained in main memory 415 causes computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to implement illustrative implementations. Thus, implementations are not limited to any specific combination of hardware circuitry and software.

The systems and methods as described in the present disclosure may be implementable for any type of third-party content item (i.e., for any type of content item to be displayed on a resource). In one implementation, the content items may include advertisements. In one implementation, the content items may include any text, images, video, stories (e.g., news stories), social media content, links, or any other type of content provided by a third-party for display on the resource of a first-party content provider. The type of content item for which the content visibility methods herein are used for is not limiting.

Although an example processing system has been described in FIG. 4, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The terms "data processing apparatus" or "computing device" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

generating, by one or more processors, a conversion pixel for a resource of a content provider;

providing, by the one or more processors, a first content item for display on a search result interface;

associating, by the one or more processors, the conversion pixel to an impression of the first content item on the search result interface;

receiving, by the one or more processors, interaction data indicating user interactions with the resource, the interaction data transmitted in response to the conversion pixel causing the detection of a conversion event;

generating, by the one or more processors, log files comprising the interaction data;

parsing, by the one or more processors, the log files to identify interaction data related to the first content item;

generating, by the one or more processors using the interaction data, a conversion metric indicating an amount of view-through conversions occurring after users viewed an impression of the first content item in the search result interface;

determining, by the one or more processors, an overlap rate for the first content item, the overlap rate comprising one of:

an estimated amount of users who interact with the first content item in the search result interface without interacting with a second content item prior to conversion, wherein the second content item is part of a content campaign that includes the first content item, and the second content item is presented in a resource other than the search result interface; and an estimated amount of users who interact with both the first content item and the second content item prior to conversion;

reducing, by the one or more processors, the conversion metric using the overlap rate to generate an adjusted conversion metric; and transmitting, by the one or more processors, the adjusted conversion metric to an attribution system that attributes a plurality of conversions associated with the content campaign to the first content item and second content item.

2. The method of claim 1, wherein the overlap rate is provided by a content provider of the first content item and the second content item.

3. The method of claim 1, wherein the overlap rate is based on a historical conversion rate for the second content item.

4. The method of claim 1, further comprising determining the position of the impression of the first content item in the search interface, wherein reducing the conversion metric to generate the adjusted conversion metric comprises reducing the conversion metric based on the overlap rate and the position.

5. The method of claim 4, wherein reducing the conversion metric to generate the adjusted conversion metric comprises increasing an amount by which the conversion metric is reduced to generate the adjusted conversion metric in response to determining the position is lower within the search results interface than a threshold position.

6. The method of claim 1, further comprising:
determining a click-through conversion metric indicating an amount of click-through conversions in which the users performed a conversion after selecting the first content item; and
combining the adjusted conversion metric with the click-through conversion metric to generate a combined conversion metric for the first content item.

7. The method of claim 6, further comprising:
adjusting a cost per action metric for the first content item based on the combined conversion metric, wherein the cost per action metric represents an amount spent by a content provider per conversion for the first content item.

8. A system comprising:
at least one computing device operably coupled to at least one memory and configured to:
generate a conversion pixel for a resource of a content provider, the conversion pixel configured to detect a user interaction with the resource;
provide a first content item for display on a search result interface;
associate the conversion pixel to an impression of the first content item on the search result interface;
receive interaction data indicating user interactions with the resource, the interaction data transmitted in response to the conversion pixel causing the detection of a conversion event;
generate log files comprising the interaction data;
parsing the log files to identify interaction data related to the first content item;
generate a conversion metric indicating an amount of view-through conversions occurring after users viewed an impression of the first content item in the search result interface;
determine an overlap rate for the first content item, the overlap rate comprising one of:
an estimated amount of users who interact with the first content item in the search result interface without interacting with a second content item prior to conversion, wherein the second content item is part of a content campaign that includes the first content item, and the second content item is presented in a resource other than the search result interface; and
an estimated amount of users who interact with both the first content item and the second content item prior to conversion;
reduce the conversion metric using the overlap rate to generate an adjusted conversion metric; and
transmit the adjusted conversion metric to an attribution system that attributes a plurality of conversions associated with the content campaign to the first content item and second content item.

9. The system of claim 8, wherein the overlap rate is provided by a content provider of the first content item and the second content item.

10. The system of claim 8, wherein the overlap rate is based on a historical conversion rate for the second content item.

11. The system of claim 8, wherein the at least one computing device is further configured to determine the position of the impression of the first content item in the search interface and wherein the at least one computing device is configured to reduce the conversion metric based on the overlap rate and the position.

12. The system of claim 11, wherein the at least one computing device is configured to increase an amount by which the conversion metric is reduced to generate the adjusted conversion metric in response to determining the position is lower within the search results interface than a threshold position.

13. The system of claim 8, wherein the at least one computing device is further configured to:
determine a click-through conversion metric indicating an amount of click-through conversions in which the users performed a conversion after selecting the first content item; and
combine the adjusted conversion metric with the click-through conversion metric to generate a combined conversion metric for the first content item.

14. The system of claim 13, wherein the at least one computing device is further configured to:
adjust a cost per action metric for the first content item based on the combined conversion metric, wherein the cost per action metric represents an amount spent by a content provider per conversion for the first content item.

15. One or more computer-readable storage media having instructions stored thereon that, when executed by one or more processors, cause the one or more processors to execute operations comprising:
generating a conversion pixel for a resource of a content provider;
providing a first content item for display on a search result interface;
associating the conversion pixel to an impression of the first content item on the search result interface;
receiving interaction data indicating user interactions with the resource, the interaction data transmitted in response to the conversion pixel causing the detection of a conversion event;
generating log files comprising the interaction data;
parsing the log files to identify interaction data related to the first content item;
generating, using the interaction data, a conversion metric indicating an amount of view-through conversions occurring after users viewed an impression of the first content item in the search result interface;
determining an overlap rate for the first content item, the overlap rate comprising one of:

an estimated amount of users who interact with the first content item in the search result interface without interacting with a second content item prior to conversion, wherein the second content item is part of a content campaign that includes the first content item, and the second content item is presented in a resource other than the search result interface; and an estimated amount of users who interact with both the first content item and the second content item prior to conversion;

reducing the conversion metric using the overlap rate to generate an adjusted conversion metric; and transmitting the adjusted conversion metric to an attribution system that attributes a plurality of conversions associated with the content campaign to the first content item and second content item.

16. The computer-readable storage media of claim 15, wherein the overlap rate is provided by a content provider of the first content item and the second content item.

17. The computer-readable storage media of claim 15, wherein the overlap rate is based on a historical conversion rate for the second content item.

18. The computer-readable storage media of claim 15, the operations further comprising determining the position of the impression of the first content item in the search interface, wherein reducing the conversion metric to generate the adjusted conversion metric comprises reducing the conversion metric based on the overlap rate and the position.

19. The computer-readable storage media of claim 18, wherein reducing the conversion metric to generate the adjusted conversion metric comprises increasing an amount by which the conversion metric is reduced to generate the adjusted conversion metric in response to determining the position is lower within the search results interface than a threshold position.

20. The computer-readable storage media of claim 18, the operations further comprising:

determining a click-through conversion metric indicating an amount of click-through conversions in which the users performed a conversion after selecting the first content item;

combining the adjusted conversion metric with the click-through conversion metric to generate a combined conversion metric for the first content item; and adjusting a cost per action metric for the first content item based on the combined conversion metric, wherein the cost per action metric represents an amount spent by a content provider per conversion for the first content item.

* * * * *